US011192050B2

(12) United States Patent
Lee et al.

(10) Patent No.: US 11,192,050 B2
(45) Date of Patent: *Dec. 7, 2021

(54) MULTISTAGE FIBER FILTERING APPARATUS CAPABLE OF SELECTIVELY FILTERING

(71) Applicant: DOOSAN HEAVY INDUSTRIES & CONSTRUCTION CO., LTD., Changwon-si (KR)

(72) Inventors: Jung June Lee, Incheon (KR); Sung Won Park, Goyang-si (KR)

(73) Assignee: DOOSAN HEAVY INDUSTRIES & CONSTRUCTION CO., LTD., Gyeongsangnam-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/791,045

(22) Filed: Feb. 14, 2020

(65) Prior Publication Data

US 2020/0179838 A1 Jun. 11, 2020

Related U.S. Application Data

(63) Continuation of application No. 15/629,402, filed on Jun. 21, 2017, now Pat. No. 10,596,495.

(30) Foreign Application Priority Data

Jun. 22, 2016 (KR) .................. 10-2016-0078018

(51) Int. Cl.
*B01D 24/12* (2006.01)
*B01D 24/40* (2006.01)
(Continued)

(52) U.S. Cl.
CPC .......... *B01D 29/601* (2013.01); *B01D 24/12* (2013.01); *B01D 24/40* (2013.01); *B01D 24/4652* (2013.01); *B01D 24/4853* (2013.01); *B01D 29/56* (2013.01); *B01D 29/58* (2013.01); *B01D 29/661* (2013.01); *B01D 35/10* (2013.01); *B01D 36/02* (2013.01); *B01D 39/02* (2013.01); *B01D 39/04* (2013.01); *C02F 1/004* (2013.01);
(Continued)

(58) Field of Classification Search
CPC .... B01D 24/4853; B01D 29/56; B01D 36/02; B01D 39/02; B01D 39/04
See application file for complete search history.

(56) References Cited

U.S. PATENT DOCUMENTS

| 5,244,585 A | 9/1993 | Sugimoto et al. |
| 2010/0292844 A1 | 11/2010 | Wolf et al. |

(Continued)

FOREIGN PATENT DOCUMENTS

| JP | 2007-098305 A | 4/2007 |
| KR | 10-0438460 B1 | 6/2004 |

(Continued)

*Primary Examiner* — Bradley R Spies
(74) *Attorney, Agent, or Firm* — Invenstone Patent, LLC (57) ABSTRACT

The present invention relates to a multistage fiber filtering apparatus capable of selectively filtering depending on turbidity of raw water, in which a first filtration mode where the raw water passes through a fiber ball medium, a second filtration mode where the raw water passes through a fiber yarn medium, or a third filtration mode where the raw water passes through both of the fiber yarn medium and the fiber ball medium may be selectively operated.

16 Claims, 6 Drawing Sheets

(51) Int. Cl.
  *B01D 24/48* (2006.01)
  *B01D 29/56* (2006.01)
  *B01D 29/60* (2006.01)
  *B01D 36/02* (2006.01)
  *B01D 39/02* (2006.01)
  *B01D 39/04* (2006.01)
  *C02F 1/00* (2006.01)
  *B01D 24/46* (2006.01)
  *B01D 29/58* (2006.01)
  *B01D 29/66* (2006.01)
  *B01D 35/10* (2006.01)

(52) U.S. Cl.
  CPC ........ *C02F 1/008* (2013.01); *B01D 2201/087* (2013.01); *B01D 2201/186* (2013.01); *C02F 2209/11* (2013.01)

(56) References Cited

U.S. PATENT DOCUMENTS

| | | |
|---|---|---|
| 2010/0314309 A1 | 12/2010 | Kang et al. |
| 2014/0014562 A1 | 1/2014 | Woo et al. |
| 2015/0182884 A1 | 7/2015 | Lee et al. |

FOREIGN PATENT DOCUMENTS

| | | |
|---|---|---|
| KR | 10-0898122 B1 | 5/2009 |
| KR | 10-2015-0079193 A | 7/2015 |

MULTISTAGE FIBER FILTERING APPARATUS CAPABLE OF SELECTIVELY FILTERING

CROSS-REFERENCE TO RELATED APPLICATION

This application is a continuation of U.S. application Ser. No. 15/629,402, filed on Jun. 21, 2017, which claims priority to Korean Patent Application No. 10-2016-0078018 filed on Jun. 22, 2016, the disclosure of which is incorporated herein by reference in its entirety.

BACKGROUND OF THE INVENTION

Field of the Invention

Exemplary embodiments of the present invention relate to a multistage fiber filtering apparatus and, more particularly, to a multistage fiber filtering apparatus capable of selectively filtering depending on turbidity of raw water.

Description of the Related Art

In general, a filtering apparatus which filters contaminated raw water by using a filter to make the contaminated raw water clean treated water and supply it has been widely used not only for drinking water but also for treatment of water and sewage or factory water. In particular, the filtering apparatus used for treatment of river water or factory wastewater or seawater desalination facilities is becoming larger and larger in order to increase the water quantity to be treated and improve water quality.

There is a multi type filtering apparatus that is used for the large-capacity water treatment applications. For example, Korean Patent No. 10-0438460 entitled "Multi type air gap controlling fiber filter" can be referred for teaching such.

In addition, as a method used in existing water purification plants, water treatment plants, or seawater desalination plants, there is a method for filtering water produced from the filter again using a cartridge filter separately installed, which requires a lot of installation sites and costs. In summary, in the above case, there is a problem in that the occupied space or the installation space becomes very large and thus a lot of site is required or cost is increased.

Accordingly, in order to improve the treating speed and improve the water quality, a plurality of filters are used or a plurality of stages (multi stages) are arranged in the same filtration tank. For example, Korean Patent No. 10-0898122 entitled 'Vertical multistage link type pore control fiber filter' is disclosed.

In the existing vertical multistage link type pore control fiber filter, if an air gap controlling fiber filter medium is formed in a filtration tank around a strainer so that raw water in the filtration tank passes through the fiber filter medium to be introduced into the strainer, a plurality of unit fiber filters draining the raw water to a lower end of the strainer are vertically stacked by making lower ends of the strainer of the respective unit fiber filters communicate with upper ends of the filtration tank of the respective lower unit fiber filters, the filtration tank of an uppermost unit fiber filter is provided with a raw water inlet through which external raw water is introduced, and the lower end of the strainer of a lowermost unit fiber filter communicates with a filtered water discharge pipe to drain filtered water to an external water tank.

Figure 1:
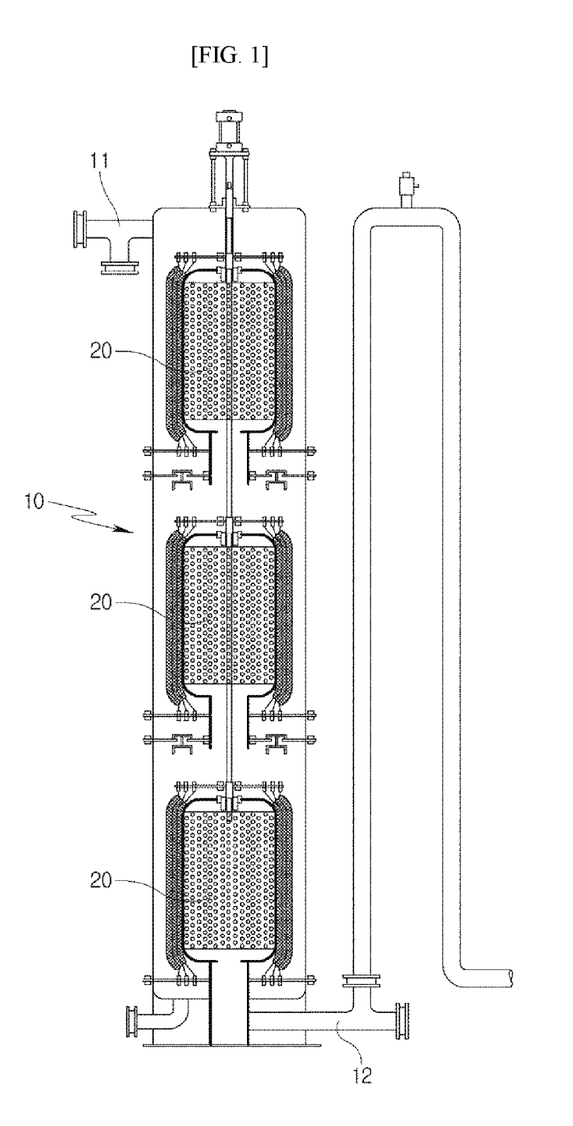
FIG. 1 is a cross-sectional view illustrating an existing vertical multistage link type pore control fiber filter.

At this time, the vertical multistage link type pore control fiber filter has a structure in which the raw water is introduced through the raw water inlet pipe 11 formed at an uppermost end of a filtration tank 10, passes through all multistage fiber media 20, and then is discharged through a filtered water discharge pipe 12 formed at a lowermost end of the filtration tank 10.

However, the quality of the raw water to be treated is variable. In particular, the fluctuation in the quality of the raw water is very large during summer and rainfall, and therefore the raw water cannot but unnecessarily pass through all the fiber media even if the raw water need not be subjected to the multistage filtration all the time.

RELATED ART DOCUMENT

Patent Document

Korea Patent No. 10-0898122 (May 11, 2009)

SUMMARY OF THE INVENTION

The present invention provides a multistage fiber filtering apparatus capable of selectively filtering depending on turbidity of raw water.

Other aspects of the present invention can be understood by the following description, and become apparent with reference to the embodiments of the present invention. Also, it is obvious to those skilled in the art to which the present invention pertains that benefits of the present invention can be realized by the means as claimed and combinations thereof.

In accordance with one aspect of the present invention, a multistage fiber filtering apparatus comprises: an enclosure configured to include an upper box and a lower box communicating with the upper box; a strainer configured to be installed in the upper box along a longitudinal direction; a plurality of fiber yarn media configured to be fixed to upper and lower fixing means, each of the upper and lower fixing means coupled to upper and lower portions of the strainer, to form a first filtering layer while surrounding an outer circumferential surface of the strainer; and a plurality of fiber ball media configured to be built in the lower box to form a second filtering layer; wherein a first filtration mode, raw water passing through the fiber ball medium; a second filtration mode, the raw water passing through the fiber yarn medium; or a third filtration mode, the raw water passing through both of the fiber yarn medium and the fiber ball medium, may be selectively operated depending on turbidity of the raw water.

The multistage fiber filtering apparatus may further include: a turbidity meter configured to measure the turbidity of the raw water.

When the turbidity measured by the turbidity meter is low, the raw water may be filtered by the first filtration mode; when the turbidity measured by the turbidity meter is medium, the raw water may be filtered by the second filtration mode; and when the turbidity measured by the turbidity meter is high, the raw material may be filtered by the third filtration mode.

The multistage fiber filtering apparatus may further include: a first pipe configured to be formed on one side wall of a lower portion of the upper box and introduce the raw water; a second pipe configured to be formed on one side wall of a lower portion of the lower box and discharge filtered water; and a third pipe configured to be formed on one side wall of an upper portion of the lower box and introduce the raw water or discharge the filtered water.

In the first filtration mode, the raw water may be introduced through the third pipe to pass through the fiber ball medium and then be discharged through the second pipe.

In the second filtration mode, the raw water may be introduced through the first pipe to pass through the fiber yarn medium and then be discharged through the third pipe.

In the third filtration mode, the raw water may be introduced through the first pipe to sequentially pass through the fiber yarn medium and the fiber ball medium and then be discharged through the second pipe.

The first pipe may include: a raw water inlet pipe configured to be provided with a raw water inlet control valve controlling an introduced amount of raw water; and a backwashing water discharge pipe configured to be provided with a backwashing water discharge control valve regulating a discharged amount of backwashing water.

The multistage fiber filtering apparatus may further include: a first air inlet pipe configured to be connected to one side of the second pipe to introduce air during backwashing.

The multistage fiber filtering apparatus may further include: a second air inlet pipe configured to be connected to one side of the third pipe to introduce air during backwashing.

The multistage fiber filtering apparatus may further include: an air discharge pipe configured to be formed on an upper surface of the upper box to discharge air.

The multistage fiber filtering apparatus may further include: a controller configured to selectively introduce the raw water into the first pipe or the third pipe depending on the turbidity measured by the turbidity meter.

The controller may control the raw water to be introduced through the third pipe when the turbidity measured by the turbidity meter is low turbidity and control the raw water to be introduced through the first pipe when the turbidity is medium turbidity or high turbidity.

A part of the second pipe may be provided with a second pipe control valve for determining a discharged amount of the filtered water.

A part of the third pipe may be provided with a third pipe control valve for determining the introduced amount of raw water or the discharged amount of filtered water.

The controller may control the third pipe control valve and the second pipe control valve to be open when the raw water is of low turbidity so that the raw water is filtered by the first filtration mode.

The controller may control a control valve, which is disposed in the first pipe, to regulate an introduced amount of raw material. When the raw water is of medium turbidity, the controller may control the third pipe control valve to be open and may control the second pipe control valve to be closed to filter the raw water by the second filtration mode.

When the raw water is of high turbidity, the controller may control the second pipe control valve to be open and may control the third pipe control valve to be closed to filter the raw water by the third filtration mode.

A distribution plate provided with a plurality of distribution grooves may be installed between the upper box and the lower box.

A lower end of the upper box may be provided with a swash plate reaching from a lower end of the strainer to an outer surface of the lower box along a circumferential direction.

BRIEF DESCRIPTION OF THE DRAWINGS

The above and other features of the present invention will be more clearly understood from the following detailed description taken in conjunction with the accompanying drawings, in which.

DESCRIPTION OF SPECIFIC EMBODIMENTS

Hereinafter, a multistage fiber filtering apparatus capable of selectively filtering according to an exemplary embodiment of the present invention will be described with reference to FIGS. 2 to 6.

Further, terms to be described below are terms defined in consideration of the functions of the present invention, which may be changed depending on user's or operator's intentions or practices. The following embodiments do not limit the scope of the present invention but are only exemplary matters of components proposed in the claim of the present invention.

A part irrelevant to the description will be omitted to clearly describe the present invention, and the same elements will be designated by the same reference numerals throughout the specification. In the present specification, unless explicitly described to the contrary, "comprising" any components will be understood to imply the inclusion of other components rather than the exclusion of any other elements.

Figure 2:
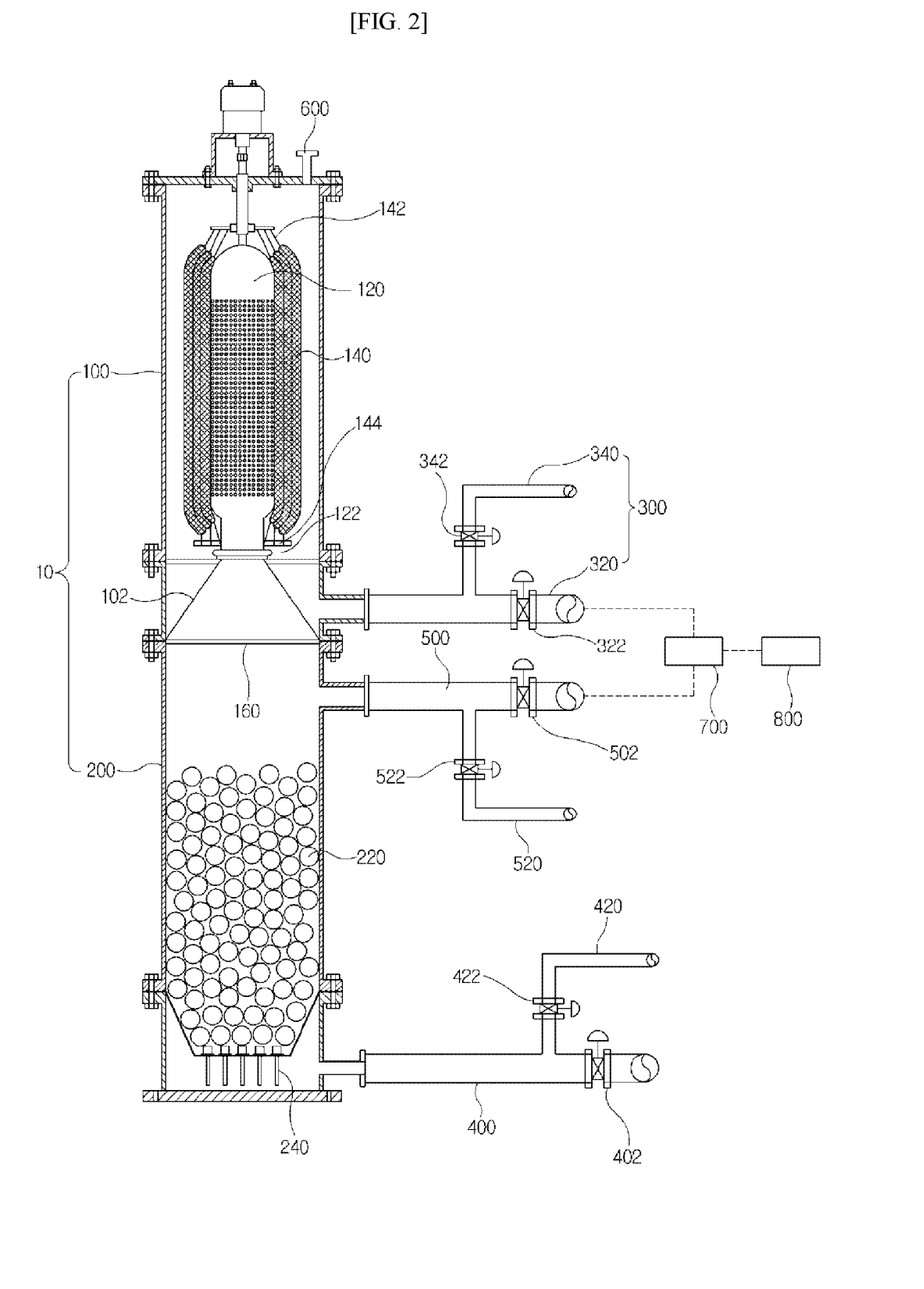
FIG. 2 is a cross-sectional view of a multistage fiber filtering apparatus according to an embodiment of the present invention.
Figure 3:
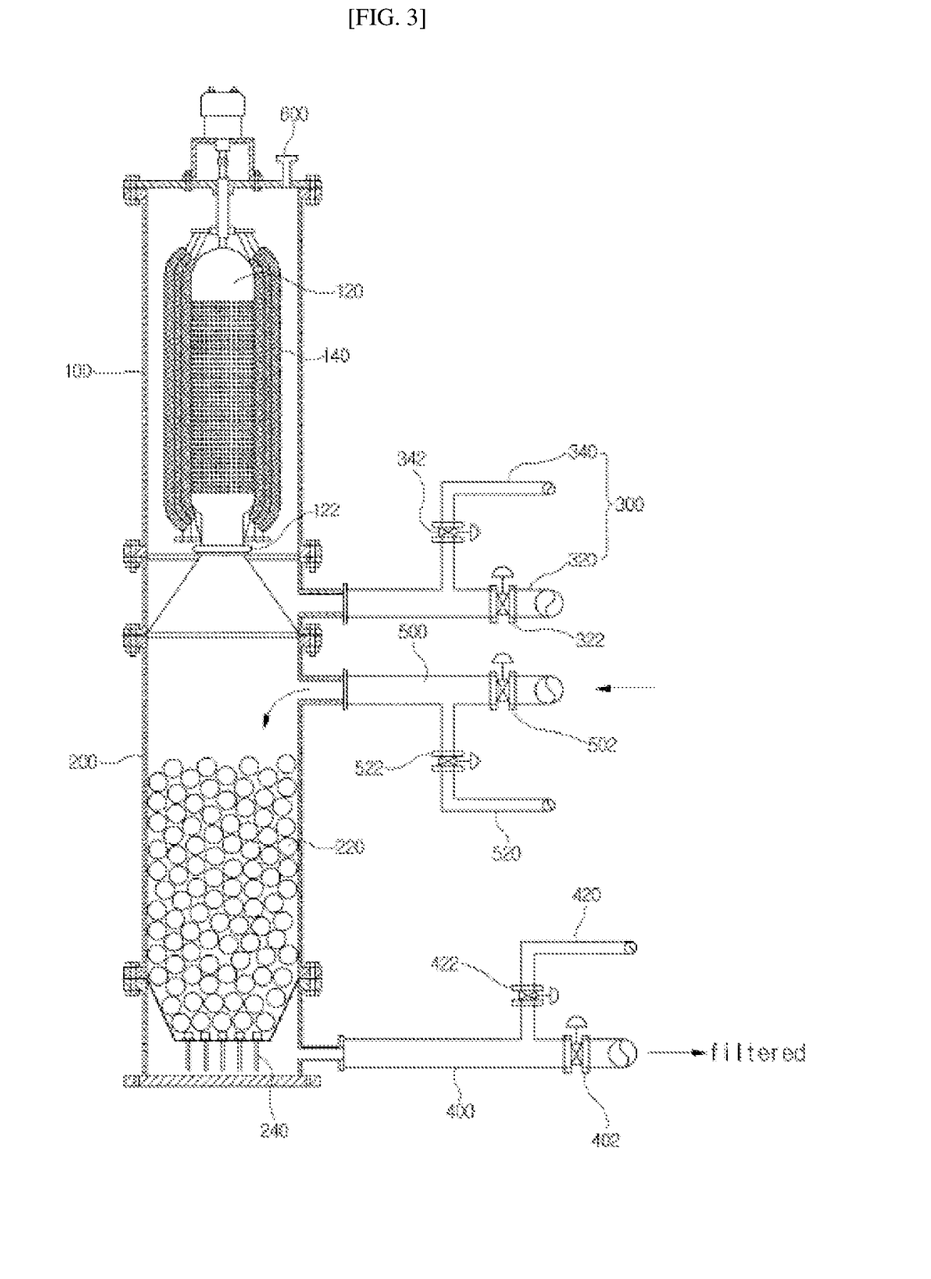
FIG. 3 is a cross-sectional view illustrating a 1-stage filtering operation of a fiber ball medium in the multistage fiber filtering apparatus of FIG. 2.
Figure 4:
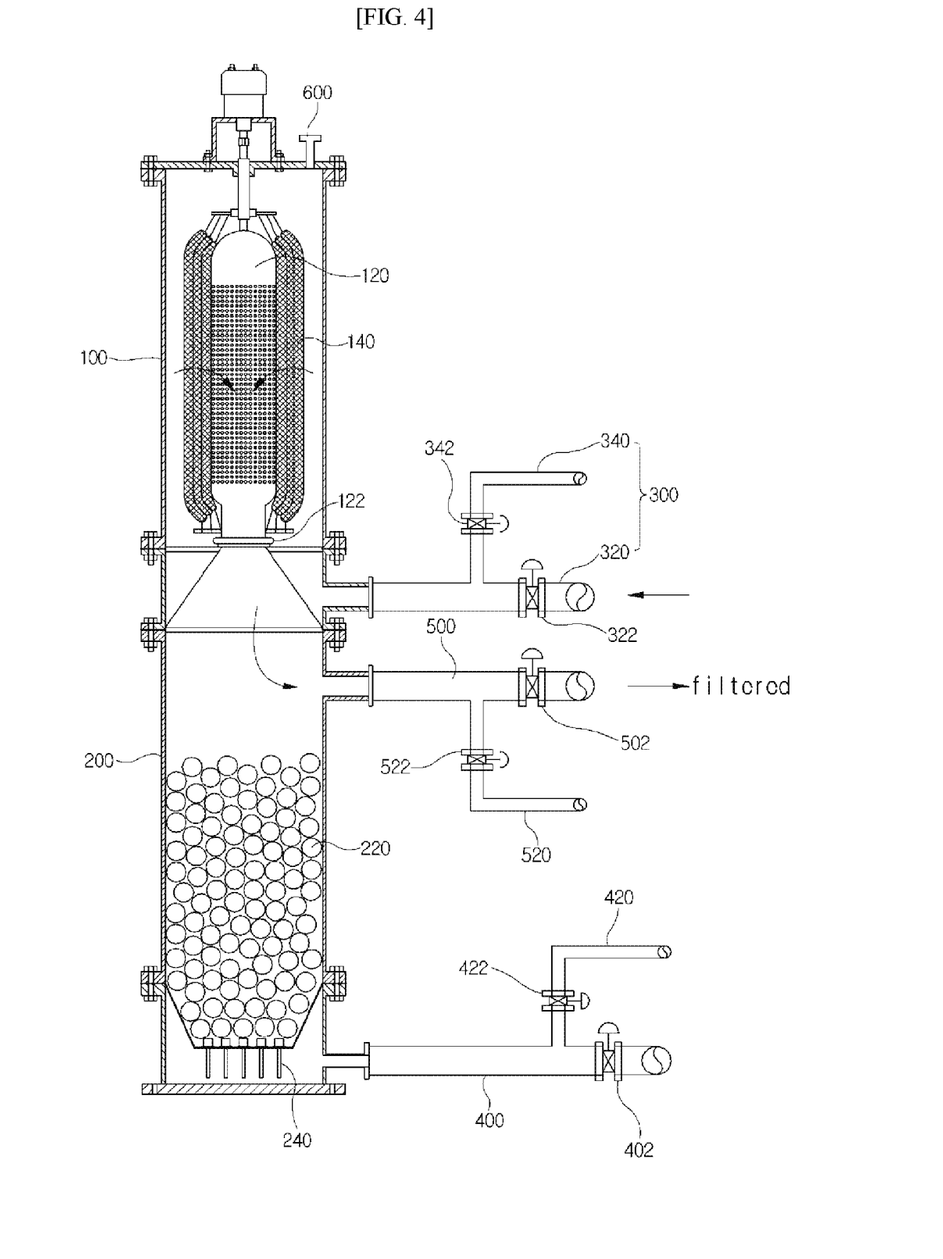
FIG. 4 is a cross-sectional view illustrating the 1-stage filtering operation of a fiber yarn medium in the multistage fiber filtering apparatus of FIG. 2.
Figure 5:
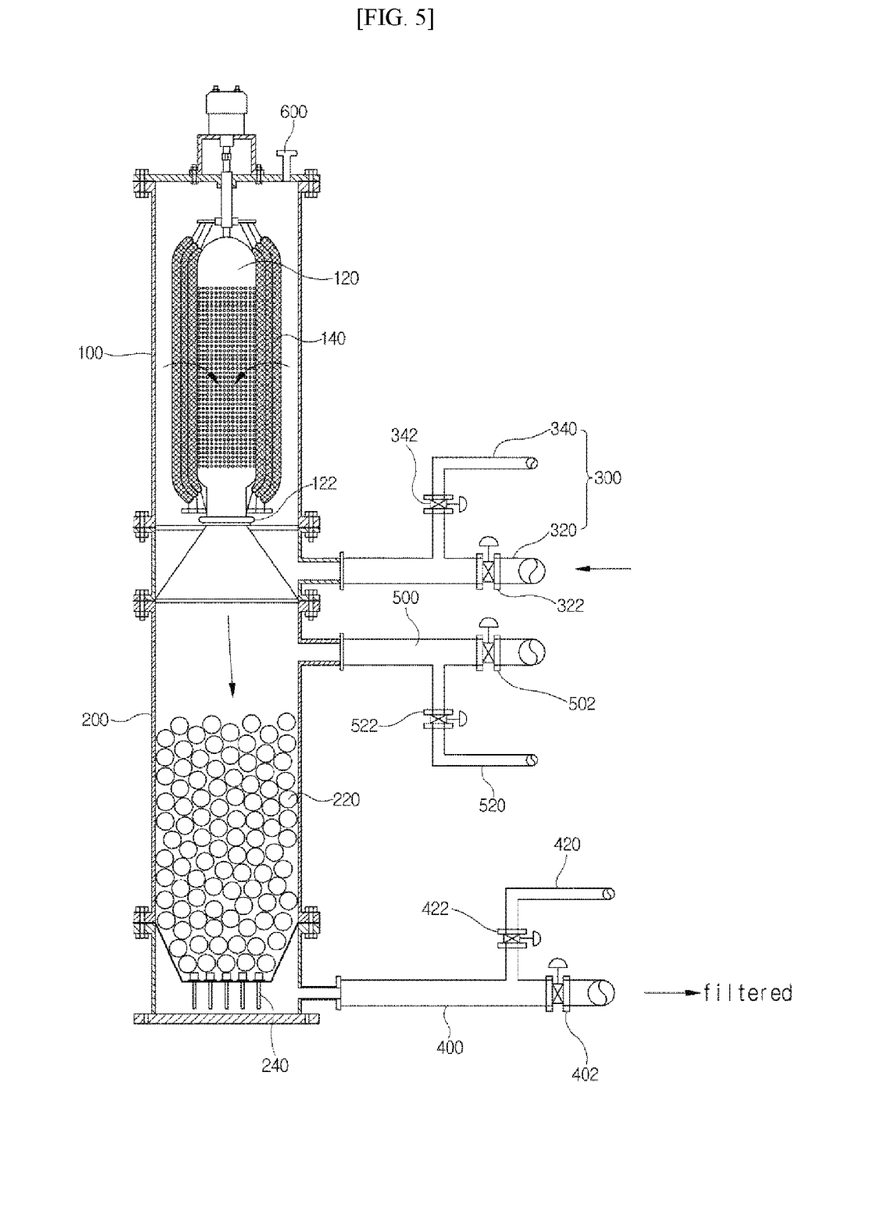
FIG. 5 is a cross-sectional view illustrating a 2-stage filtering operation of a fiber yarn medium and a fiber ball medium in the multistage fiber filtering apparatus of FIG. 2.
Figure 6:
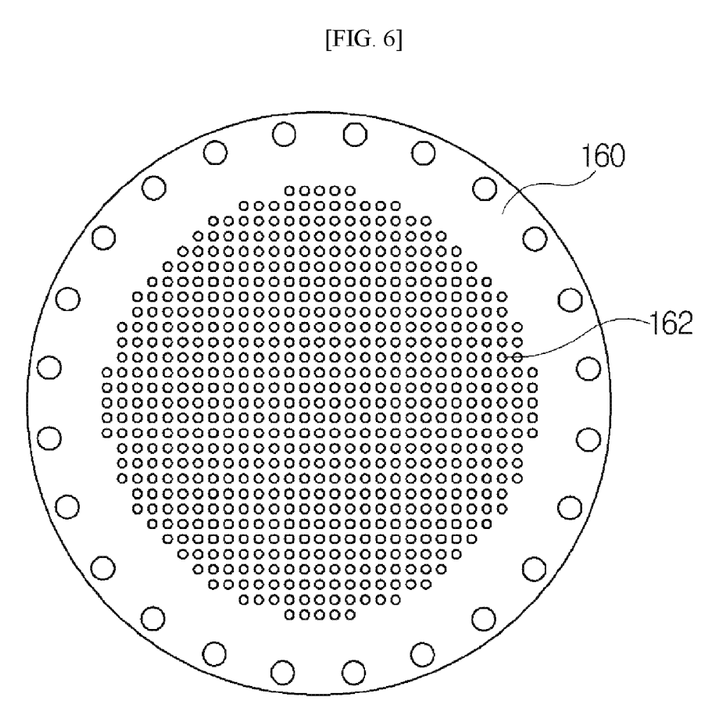
FIG. 6 is a diagram illustrating a distribution plate of FIG. 2 separately.

FIG. 2 is a cross-sectional view of a multistage fiber filtering apparatus according to an embodiment of the present invention, FIG. 3 is a cross-sectional view illustrating a 1 stage filtering operation of an fiber ball medium in the multistage fiber filtering apparatus of FIG. 2, FIG. 4 is a cross-sectional view illustrating the 1-stage filtering operation of the fiber yarn medium in the multistage fiber filtering apparatus of FIG. 2, FIG. 5 is a cross-sectional view illustrating a 2-stage filtering operation of the fiber yarn medium and the fiber ball medium in the multistage fiber filtering apparatus of FIG. 2, and FIG. 6 is a diagram illustrating a distribution plate of FIG. 2 separately.

In the description of embodiments of the present invention, raw water refers to a fluid before being introduced into a multistage fiber filtering apparatus of the present invention for filtration, and filtered water refers to a fluid discharged from the multistage fiber filtering apparatus of the present invention in the filtered state.

However, the term is not limited thereto, and the raw water may be referred to as filtered water, treated water, discharged water, or the like, with changing a name depending on a moving route or a moving state.

First, a multistage fiber filtering apparatus according to an embodiment of the present invention will be described with reference to FIG. 2.

The multistage fiber filtering apparatus according to an embodiment of the present invention may be configured to largely include an enclosure 10 including an upper box 100 and a lower box 200 communicating with the upper box 100, a strainer 120, a plurality of fiber yarn media 140 forming a first filtering layer, a plurality of fiber ball media 220 forming a second filtering layer, a first pipe 300, a second pipe 400, and a third pipe 500.

The enclosure 10 is formed in a multi-layered structure and includes the lower box 200 installed at a bottom and the upper box 100 installed at an upper portion of the lower box 200. The upper box 100 and the lower box 200 may be preferably formed as a cylindrical body and may have the same diameter. Further, the upper box 100 and the lower box 200 are communicated with each other and may be integrally formed according to the embodiment.

One side of the lower portion of the upper box 100 is connected to the first pipe 300 into which raw water is introduced during filtration. The first pipe 300 may not only be provided with water during filtration but may also discharge backwashing water during backwashing. However, the present invention is not limited thereto, and a pipe for discharging backwashing water may be separately provided on the other side of the lower portion of the upper box 100.

In the present embodiment, the first pipe 300 includes a raw water inlet pipe 320 provided with a raw water inlet control valve 322 for regulating an introduced amount of raw water, and a backwashing water discharge pipe 340 provided with a backwashing water discharge control valve 342 for regulating a discharged amount of backwashing water. In this way, a location where the raw water is introduced during filtration and a location where the backwashing water is discharged may be separated from each other. The introduced amount of raw water may be regulated by the raw water inlet control valve 322 to prevent the raw water from being introduced, and the discharged amount of backwashing water may be regulated by the backwashing water discharge control valve 342 to prevent a fluid in the upper box 100 from being discharged.

A second pipe 400 for discharging filtered water during filtration is connected to one side of the lower side of the lower box 200. The second pipe 400 may not only be provided with filtered water during filtration but also introduced with backwashing water during backwashing.

A portion of the second pipe 400 may be provided with a second pipe control valve 402 to determine the discharged amount of filtered water or the introduced amount of washing water.

Further, a first air inlet pipe 420 connected to one side of the lower box 200 or one side of the second pipe 400 to introduce air during backwashing may be formed. A part of the first air inlet pipe 420 may be provided with a first air inlet control valve 422 to control the introduced amount of air.

One side of the upper portion of the lower box 200 is connected to a third pipe 500 for introducing raw water or discharging filtered water during filtration. The third pipe 500 may not only introduce raw water or discharge filtered water during filtration but may also introduce backwashing water during backwashing.

A part of the third pipe 500 may be provided with a third pipe control valve 502 to determine the introduced amount of raw water or the discharged amount of filtered water.

Further, a second air inlet pipe 520 connected to one side of the upper portion of the lower box 200 or one side of the third pipe 500 to introduce air during backwashing may be formed. A part of the second air inlet pipe 520 may be provided with a second air inlet control valve 522 to control the introduced amount of air.

In addition, an upper surface of the upper box 100 may be provided with an air discharge pipe 600 for discharging air. Accordingly, the air introduced during the backwashing may be easily discharged through an uppermost air discharge pipe 600.

The strainer 120 is installed inside the upper box 100 along a longitudinal direction, and an upper side of the strainer is closed and a lower side thereof is open. The strainer 120 may preferably be formed as a long cylindrical tube, and a side wall portion of the strainer 120 may be densely provided with a plurality of holes so that air or water may be introduced and discharged.

The plurality of fiber yarn media 140 are formed on an outer side surface of the strainer 120 along the longitudinal direction to form a first filtering layer. An upper end of the fiber yarn medium 140 is fixed to an upper fixing means 142 coupled to the upper portion of the strainer 120 and a lower end of the fiber yarn medium 140 may be fixed to a lower fixing means 144 coupled to the lower portion of the strainer 120.

The plurality of fiber yarn media 140 are evenly disposed along a circumferential direction to cover all the side portions of the strainer 120. Further, to make a filtering path of raw water long, the fiber yarn medium 140 may be formed in multiple plies to make the first filtering layer thick.

The fiber yarn medium 140 is formed as a bundle of fiber yarns, in which materials of the fiber yarn may be flexible materials such as polyester, polypropylene, and polyamide. Further, when ion filtration or the like is required depending on applications, the material of the fiber yarn may also be conductive fiber yarns such as polyethylene or polystyrene.

The fiber yarn medium 140 may be pressed or loosened along a longitudinal direction, and thus an air gap of the fiber yarn medium 140 may be regulated. For this purpose, the upper fixing means 142 may be installed so as to be movable up and down by a separate driver. That is, if the upper fixing means 142 moves upward, the fiber yarn medium 140 is pulled and pressed on the strainer 120 to reduce a size of the air gap and if the upper fixing means 142 moves downward, the fiber yarn medium 140 has a reduced tension force and is loosed to increase the size of the air gap.

A distribution plate 160 may be installed between the upper box 100 and the lower box 200. Referring to FIGS. 2 and 6, a disc-shaped body of the distribution plate 160 is provided with a plurality of distribution grooves 162 having a uniform size, and the filtered water passing through the fiber yarn medium 140 and the strainer 120 is evenly dispersed and put in the lower housing 200.

A backwashing nozzle unit 122 may be provided under the strainer 120. The backwashing nozzle unit 122 may inject air, which is introduced into the upper portion of the lower box 200 through the second air inlet pipe 520, upward and the air and water injected upward shake the lower portion of the fiber yarn medium 140. Accordingly, the fiber yarn medium 140 is rubbed by the backwashing water and the air, thereby more efficiently performing washing.

Meanwhile, the lower end of the upper box 100 may be provided with a swash plate 102 reaching from the lower end of the strainer 120 to an outer surface of the lower box 200 along a circumferential direction so that primarily filtered water discharged from the strainer is widely dispersed to an outside of the lower box 200 and put therein. That is, the swash plate 102 is formed in the form of a truncated cone when viewed from a sectional view. Accordingly, a part of the filtered water passing through the fiber yarn medium 140 may flow along an inner surface of the swash plate 102 and then may be put in the lower box 200 through the distribution plate 160.

The plurality of fiber ball media 220 are provided inside the lower box 200 to form the second filtering layer. The fiber ball medium 220 is a spherical porous filter made of cotton or the like and serves to secondarily filter the primarily filtered water passing through the fiber yarn media 140 and the strainer 120 of the upper box 100. The fiber ball medium 220 may include a rigidly formed core portion and a target portion connected to the core portion to form a thick fiber layer and may be formed to have a diameter ranging from approximately 10 to 50 mm.

In addition, a lower surface of the lower box 200 includes a central portion formed as a flat plate and an outer portion formed as an inclined surface, in which the central portion may be provided with a plurality of strainer nozzles 240. The strainer nozzle 240 injects air or washing water upward so that the fiber ball media 220 may be mixed with each other. Therefore, when air or water is jetted from the strainer nozzle 240, a circulation flow is formed upward from the central portion and downward from the outer portion, such that the fiber ball media 220 may be evenly washed while being smoothly mixed with each other, and a surface layer of the second filtering layer may be arbitrarily located while being mixed with the plurality of fiber ball media 220, thereby effectively keeping the filtration performance for a long period of time.

In the multistage fiber filtering apparatus of the present invention, a first filtration mode passing through the fiber ball medium 220, a second filtration mode passing through the fiber yarn medium 140, or a third filtration mode passing through both of the filter yarn medium 140 and the fiber ball medium 220 is selectively operated depending on the turbidity of raw water.

To this end, a turbidity meter 700 for measuring the turbidity of the raw water may be further provided.

Accordingly, when the turbidity measured by the turbidity meter 700 is low turbidity, the raw water is filtered by the first filtration mode; when the turbidity is medium turbidity, the raw water is filtered by the second filtration mode; and when the turbidity is high turbidity, the raw water is filtered by the third filtration mode.

Next, the filtering operations according to the first to third filtration modes of the multistage fiber filtering apparatus according to the embodiment of the present invention will be described in detail with reference to FIGS. 3 to 5.

The first filtration mode is a mode filtered only by the fiber ball medium 220 when the raw water has low turbidity and does not pass through the fiber yarn medium 140. As illustrated in FIG. 3, in the first filtration mode, the raw water is introduced through the third pipe 500 to pass through the fiber ball medium 220, and is filtered and then discharged as filtered water through the second pipe 400. At this time, the third pipe control valve 502 is open to introduce the raw water, and the second pipe control valve 402 is also open to discharge the filtered water.

Further, the second filtration mode is a mode filtered only by the fiber yarn medium 140 when the raw water has medium turbidity and does not pass through the fiber ball medium 220. In detail, as illustrated in FIG. 4, in the second filtration mode, the raw water is introduced through the first pipe 300, and in the present embodiment, is introduced through the raw water inlet pipe 320. To this end, the raw water inlet control valve 322 is kept in an open state. At this time, the raw water may be pressurized by a pump (not shown) formed on the outside of the raw water inlet pipe 320 and may be introduced into the upper box 100, and a height of the raw water stored in a space between the upper box 100 and the strainer 120 is increased by water pressure.

The raw water passes through the first filtering layer formed of the fiber yarn medium 140 and is filtered, and is then introduced into the strainer 120 through a through hole of the strainer 120. In this way, the filtered water filtered by the fiber yarn medium 140 flows downward or drops along an inner wall of the strainer 120 and an inner wall of the swash plate 102 to reach the distribution plate 160. Next, the filtered water may be introduced into the lower box 200 through the plurality of distribution grooves 162 formed on the distribution plate 160. At this time, the second pipe control valve 402 is kept in a closed state and the third pipe control valve 502 is kept in an open state, such that the filtered water is not discharged through the second pipe 400 via the fiber ball medium 220 but is discharged through the third pipe 500. At this time, since the second pipe control valve 402 is kept in the closed state, as the filtered water or the treated water that has been treated when it is operated in the existing filtration mode is converted into the second filtration mode, a water level of the filtered water or the treated water may remain inside the lower box 200 while being retained.

The third filtration mode filters raw water by sequentially passing the raw water through the fiber yarn medium 140 and the fiber ball medium 220 when the raw water has high turbidity, and therefore has an increased filtration time and filtration amount.

In detail, as illustrated in FIG. 5, in the third filtration mode, the raw water is introduced through the first pipe 300, and in the present embodiment, is introduced through the raw water inlet pipe 320. To this end, the raw water inlet control valve 322 is kept in an open state. At this time, the raw water may be pressurized by a pump (not shown) formed on the outside of the raw water inlet pipe 320 and may be introduced into the upper box 100, and a height of the raw water stored in a space between the upper box 100 and the strainer 120 is increased by water pressure.

The raw water passes through the first filtering layer formed of the fiber yarn medium 140 and is primarily filtered, and is then introduced into the strainer 120 through a through hole of the strainer 120. In this way, the filtered water primarily filtered by the fiber yarn medium 140 flows downward or drops along the inner wall of the strainer 120 and the inner wall of the swash plate 102 to reach the distribution plate 160. Next, the filtered water may be introduced into the lower box 200 through the plurality of distribution grooves 162 formed on the distribution plate 160 and evenly distributed on the surface layer of the second filtering layer made of the fiber ball medium 220.

At this time, since the second pipe control valve 402 is kept in the open state and the third pipe control valve 502 is kept in the closed state, the primarily filtered water is not discharged through the third pipe 500 but instead passes through the second filtering layer made of the fiber ball medium 220 within the lower box 200 and is secondarily filtered. The filtered water, which has been subjected to the secondary filtration, is discharged through the second pipe 400.

As described above, in the multistage fiber filtering apparatus of the present invention, the 1-stage filtration of the fiber yarn medium 140, the 1-stage filtration of the fiber ball medium 220, or the 2-stage filtration of the fiber yarn medium 140 and the fiber ball medium 220 may be selectively performed depending on the turbidity of the raw water, such that the use of each fiber filter medium can be reduced, thereby making the replacement cycle long and reducing the maintenance cost.

In addition, the amount of backwashing water can be reduced due to the change of the filtration mode, such that the burden of wastewater treatment in the backwashing water treatment apparatus, which is the subsequent process, can be reduced and the drug consumption and the amount of sludge can be reduced.

A multistage fiber filtering apparatus according to another embodiment of the present invention may further include a controller 800 controlling raw water to be selectively introduced through the first pipe 300 or the third pipe 500 depending on the turbidity measured by the turbidity meter 700.

The controller 800 may be connected to the turbidity meter 700 to be supplied with the turbidity of raw water measured by the turbidity meter 700. Thereby, the controller 800 controls the raw water to be introduced through the third pipe 500 if the turbidity of raw water is the low turbidity and may control the raw water to be introduced through the first pipe 300 if the turbidity of the raw water is the medium or high turbidity.

At this time, a predetermined value may be input as a reference value for dividing the raw water into low turbidity, medium turbidity, and high turbidity.

Specifically, when the raw water is of low turbidity, the controller 800 controls the third pipe control valve 502 to be open so that the raw water may be introduced through the third pipe 500, and also controls the second pipe control valve 402 to be open so that the treated water filtered by passing through the fiber ball medium 220 may be discharged through the second pipe 400.

When the raw water is of medium turbidity, the controller 800 controls the raw water inlet control valve 322 to be open so that the raw water may be introduced through the first pipe 300 and the raw water inlet pipe 320 in the present embodiment and controls the third pipe control valve 502 to be open so that the filtered water filtered by passing through the fiber yarn medium 140 may be discharged through the third pipe 500, and, at the same time, controls the second pipe control valve 402 to be closed so that the filtered water is not discharged through the second pipe 400.

Further, when the raw water is of high turbidity, the controller 800 may control the raw water inlet control valve 322 to be open so that the raw water may be introduced through the first pipe 300 and the raw water inlet pipe 320 in the present embodiment and may control the second pipe control valve 402 to be open simultaneously with controlling the third pipe control valve 502 to be closed so that the filtered water primarily filtered by passing through the fiber yarn medium 140 may be introduced into the lower box 200 to pass through the fiber ball medium 220 and may be secondarily filtered to be discharged through second pipe 400.

Next, in the multistage fiber filtering apparatus according to an embodiment of the present invention, the backwashing operation will be described below.

The multistage fiber filtering apparatus according to an embodiment of the present invention may also perform the backwashing operation by the first and second backwashing modes.

The first backwashing mode may be performed when both the fiber yarn medium 140 and the fiber ball medium 220 need to be backwashed. The fiber ball medium 220 may be primarily washed by the washing water introduced through the second pipe 400 at the lower portion of the lower box 200, and the fiber yarn medium 140 is secondarily washed by the washing water of which the water level rises and then the backwashing water may be discharged through the first pipe 300 at the lower portion of the upper box 100.

Further, the second backwashing mode is performed only when the backwashing of the fiber yarn medium 140 is required, and the fiber yarn medium 140 is washed by the washing water introduced through the third pipe 500 at the upper portion of the lower box 200 and then the backwashing water may be discharged through the first pipe 300 at the lower portion of the upper box 100.

According to the multistage fiber filtering apparatus capable of selectively filtering, it is possible to selectively operate the 1-stage filtration of the fiber yarn medium, the 1-stage filtration of the fiber ball medium, or the 2-stage filtration of the fiber yarn medium and the fiber ball medium depending on the turbidity of the raw water.

As a result, the use of each fiber filter media may be reduced and the replacement period is long, such that the maintenance cost can be reduced.

In addition, the amount of backwashing water can be reduced due to the change of the filtration mode, such that the burden of wastewater treatment in the backwashing water treatment apparatus, which is the subsequent process, can be reduced and the drug consumption and the amount of sludge can be reduced.

It should be understood that the effects of the present invention are not limited to the effects described above, but include all effects that can be deduced from the detailed description of the present invention or the configurations of the invention described in the claims. The present invention is not limited to the above-described specific embodiments and descriptions, and various modifications can be made to those skilled in the art without departing from the gist of the present invention claimed in the claims and the modifications are within the scope of protection of the present invention.

What is claimed is:
1. A multistage fiber filtering apparatus comprising:
an enclosure configured to include an upper box and a lower box communicating with the upper box
a strainer configured to be installed in the upper box along a longitudinal direction;
a plurality of fiber yarn media configured to surround an outer circumferential surface of the strainer to form a first filtering layer;
a plurality of fiber ball media configured to be built in the lower box to form a second filtering layer;
a first pipe configured to be formed on one side wall of a lower portion of the upper box and to introduce the raw water;
a second pipe configured to be formed on one side wall of a lower portion of the lower box and to discharge filtered water;
a third pipe configured to be formed on one side wall of an upper portion of the lower box and to introduce the raw water or discharge the filtered water; and
a controller configured to selectively introduce the raw water into the first pipe or the third pipe depending on a turbidity of the raw water in a filtering mode, and selectively introduce a washing water into the second pipe or the third pipe depending on the turbidity in a backwashing mode.

2. The multistage fiber filtering apparatus of claim 1, wherein the controller is configured to selectively discharge the raw water through the second pipe or the third pipe depending on the turbidity in the filtering mode.

3. The multistage fiber filtering apparatus of claim 1, wherein the controller is configured to selectively operate a first backwashing mode in which the backwashing water washes both of the fiber yarn medium and the fiber ball medium, or a second backwashing mode in which the backwashing water washes the fiber yarn medium depending on the turbidity in the backwashing mode.

4. The multistage fiber filtering apparatus of claim 3, wherein the controller is configured to introduce the backwashing water through the second pipe to wash both of the fiber yarn medium and the fiber ball medium and discharge the backwashing water through the first pipe in the first backwashing mode.

5. The multistage fiber filtering apparatus of claim 4, wherein the controller is configured to introduce the backwashing water through the third pipe to wash the fiber yarn medium and discharge the backwashing water through the first pipe in the second backwashing mode.

6. The multistage fiber filtering apparatus of claim 2, wherein the controller is configured to selectively operate a first filtration mode in which the raw water passes through the fiber ball medium, a second filtration mode in which the raw water passes through the fiber yarn medium, or a third filtration mode in which the raw water passes through both of the fiber yarn medium and the fiber ball medium depending on the turbidity in the filtering mode.

7. The multistage fiber filtering apparatus of claim 6, further comprising:
a turbidity meter configured to measure the turbidity of the raw water.

8. The multistage fiber filtering apparatus of claim 7, wherein the controller is configured to operate the first filtration mode in response to measuring of low-turbidity that is measured by the turbidity meter, operate the second filtration mode in response to measuring of medium-turbidity that is measured by the turbidity meter, and operate the third filtration mode in response to measuring of high-turbidity that is measured by the turbidity meter.

9. The multistage fiber filtering apparatus of claim 6, wherein the controller is configured to introduce the raw water through the third pipe to pass through the fiber ball medium and discharge the raw water through the second pipe in the first filtration mode.

10. The multistage fiber filtering apparatus of claim 9, wherein the controller is configured to introduce the raw water through the first pipe to pass through the fiber yarn medium and discharge the raw water through the third pipe in the second filtration mode.

11. The multistage fiber filtering apparatus of claim 10, wherein the controller is configured to introduce the raw water through the first pipe to pass through both of the fiber yarn medium and the fiber ball medium and discharge the raw water through the third pipe in the second filtration mode.

12. The multistage fiber filtering apparatus of claim 11, wherein the first pipe comprises:
a raw water inlet pipe including a raw water inlet control valve to control an introduced amount of raw water; and
a backwashing water discharge pipe including a backwashing water discharge control valve to regulate a discharged amount of backwashing water.

13. The multistage fiber filtering apparatus of claim 12, wherein the second pipe comprises:
a backwashing water inlet pipe including a backwashing water inlet control valve to control an introduced amount of backwashing water;
a filtered water discharge pipe including a filtered water discharge control valve to regulate a discharged amount of filtered water; and
a first air inlet pipe to introduce air in the backwashing mode.

14. The multistage fiber filtering apparatus of claim 13, wherein the third pipe comprises:
a raw water inlet pipe including a raw water inlet control valve to control an introduced amount of raw water;
a filtered water discharge pipe including a filtered water discharge control valve to regulate a discharged amount of filtered water;
a backwashing water inlet pipe including a backwashing water inlet control valve to control an introduced amount of backwashing water; and
a second air inlet pipe to introduce air in the backwashing mode.

15. The multistage fiber filtering apparatus of claim 14, further comprising:
an air discharge pipe located on an upper surface of the upper box to discharge air in the backwashing mode.

16. The multistage fiber filtering apparatus of claim 14, further comprising:
a backwashing nozzle located under the strainer to inject air which is introduced into an upper portion of the lower box through the second air inlet pipe upward.

* * * * *